US006761070B2

(12) United States Patent
Zarabadi et al.

(10) Patent No.: US 6,761,070 B2
(45) Date of Patent: Jul. 13, 2004

(54) MICROFABRICATED LINEAR ACCELEROMETER

(75) Inventors: Seyed R. Zarabadi, Kokomo, IN (US); John C. Christenson, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 87 days.

(21) Appl. No.: 10/059,010

(22) Filed: Jan. 31, 2002

(65) Prior Publication Data

US 2003/0140700 A1 Jul. 31, 2003

(51) Int. Cl.[7] .............................................. G01P 15/125
(52) U.S. Cl. .................................. 73/514.32; 73/514.38
(58) Field of Search .......................... 73/514.16, 514.32, 73/514.38; 361/280

(56) References Cited

U.S. PATENT DOCUMENTS

| | | | |
|---|---|---|---|
| 2,912,657 A | 11/1959 | Schaevitz | 336/30 |
| 2,916,279 A | 12/1959 | Stanton | 264/1 |
| 4,435,737 A | 3/1984 | Colton | 361/280 |
| 4,699,006 A | 10/1987 | Boxenhorn | 73/517 |
| 4,736,629 A | 4/1988 | Cole | 73/517 |
| 4,805,456 A | 2/1989 | Howe et al. | 73/517 |
| 4,851,080 A | 7/1989 | Howe et al. | 156/647 |
| 5,092,174 A | 3/1992 | Reidemeister et al. | 73/517 |
| 5,146,389 A | 9/1992 | Ristic et al. | 361/283 |
| 5,226,321 A | 7/1993 | Varnham et al. | 73/505 |
| 5,233,213 A | 8/1993 | Marek | 257/415 |
| 5,249,465 A | 10/1993 | Bennett et al. | 73/510 |
| 5,251,484 A | 10/1993 | Mastache | 73/517 |

(List continued on next page.)

FOREIGN PATENT DOCUMENTS

| | | | | |
|---|---|---|---|---|
| SU | 583397 | 12/1977 | | 73/517 A |
| SU | 1035523 | 8/1983 | | 73/517 A |
| SU | 1040424 | 9/1983 | | 73/517 A |

OTHER PUBLICATIONS

"Surface Micromachined Angular Accelerometer with Force Feedback" T.J. Brosnihan, A.P. Pisano and R.T. Howe, DSC–vol. 57–2, 1995, IMECE pp. 941–947.

"Embedded Interconnect and Electrical Isolation for High–Aspect–Ratio, SOI Inertial Instruments" T.J. Brosnihan, J.M. Bustillo, A.P. Pisano and R.T. Howe, 1997 International Conference on Solid–State Sensors and Actuators, Chicago, Jun. 16–19, 1997, pp. 637–640.

"Rejecting Rotational Disturbances on Small Disk Drives Using Rotational Accelerometers" Daniel Y. Abramovitch, 1996, IFAC World Congress in San Francisco, CA 1996, pp. 1–6.

"Increased Disturbance Rejection in Magnetic Disk Drives by Acceleration Feedforward Control and Parameter Adaption" M.T. White and M. Tomizuka, vol. 5, No. 6, 1997, pp. 741–751.

*Primary Examiner*—Hezron Williams
*Assistant Examiner*—John Hanley
(74) *Attorney, Agent, or Firm*—Stefan V. Chmielewski

(57) ABSTRACT

A linear accelerometer is provided having a substrate, a fixed electrode supported on the substrate and including a first plurality of fixed capacitive plates, and an inertial mass substantially suspended over a cavity and including a plurality of movable capacitive plates arranged to provide a capacitive coupling with the first plurality of fixed capacitive plates. The inertial mass is linearly movable relative to the fixed electrode. A central member is fixed to the substrate. Support arms support the inertial mass relative to the fixed electrode and allow linear movement of the inertial mass upon experiencing a linear acceleration along a sensing axis, and prevent linear movement along a nonsensing axis. Inputs and output lines are electrically coupled to the fixed electrode and the inertial mass. An output signal is generated which varies as a function of the capacitive coupling and is indicative of linear acceleration along the sensing axis.

21 Claims, 6 Drawing Sheets

U.S. PATENT DOCUMENTS

| | | | | |
|---|---|---|---|---|
| 5,253,526 A | 10/1993 | Omura et al. | | 73/517 |
| 5,310,450 A | 5/1994 | Offenberg et al. | | 156/630 |
| 5,314,572 A | 5/1994 | Core et al. | | 156/643 |
| 5,345,824 A | 9/1994 | Sherman et al. | | 73/517 |
| 5,349,858 A | 9/1994 | Yagi et al. | | 73/517 |
| 5,388,460 A | 2/1995 | Sakurai et al. | | 73/517 |
| 5,417,111 A | 5/1995 | Sherman et al. | | 73/517 |
| 5,431,050 A | * 7/1995 | Yamada | | 73/514.32 |
| 5,456,109 A | 10/1995 | Lautzenhiser et al. | | 73/514.03 |
| 5,540,095 A | 7/1996 | Sherman et al. | | 73/514 |
| 5,569,852 A | 10/1996 | Marek et al. | | 73/514 |
| 5,578,755 A | 11/1996 | Offenberg | | 73/514 |
| 5,665,915 A | 9/1997 | Kobayashi et al. | | 73/514 |
| 5,707,077 A | * 1/1998 | Yokota et al. | | 280/735 |
| 5,731,520 A | * 3/1998 | Stevenson et al. | | 73/514.32 |
| 5,847,280 A | 12/1998 | Sherman et al. | | 73/514 |
| 6,000,287 A | * 12/1999 | Menzel | | 73/514.32 |
| 6,199,430 B1 | * 3/2001 | Kano et al. | | 73/514.32 |
| 6,257,062 B1 | * 7/2001 | Rich | | 73/514.32 |
| 6,428,713 B1 | 8/2002 | Christenson et al. | | 216/2 |
| 6,508,124 B1 | * 1/2003 | Zerbini et al. | | 73/514.32 |

* cited by examiner

MICROFABRICATED LINEAR ACCELEROMETER

CROSS-REFERENCE TO RELATED APPLICATION

This application is related to application Ser. No. 09/782,708 entitled "ANGULAR ACCELEROMETER," filed on Feb. 13, 2001, now issued as U.S. Pat. No. 6,393,914.

TECHNICAL FIELD

The present invention generally relates to acceleration sensors (i.e., accelerometers) and, more particularly, relates to a microfabricated capacitively coupled linear accelerometer.

BACKGROUND OF THE INVENTION

Accelerometers are commonly employed to measure the second derivative of displacement with respect to time. In particular, linear accelerometers measure linear acceleration along a particular sensing axis. Linear accelerometers are frequently employed to generate an output signal (e.g., voltage) proportional to linear acceleration for use in a vehicle control system. For example, the sensed output from a linear accelerometer may be used to control safety-related devices on an automotive vehicle, such as front and side impact air bags. In addition, low-g accelerometers are increasingly being used in automotive vehicles for vehicle dynamics control and suspension control applications.

Conventional linear accelerometers often employ an inertial mass suspended from a frame by multiple support beams. The mass, support beams, and frame generally act as a spring mass system, such that the displacement of the mass is proportional to the linear acceleration applied to the frame. The displacement of the mass generates a voltage proportional to linear acceleration, which is used as a measure of the linear acceleration.

One type of an accelerometer employs a capacitive coupling between a fixed plate and a movable plate that is movable in response to linear acceleration. For example, some capacitive type linear accelerometers employ an inertial mass suspended around the outer perimeter to a frame and having a movable capacitive plate separated from, and capacitively coupled to, a fixed capacitive plate such that displacement of the mass and movable plate changes the capacitive coupling between the fixed and movable plates. Prior known capacitive type linear accelerometers are configured with the mass connected to a substrate at the outer periphery. Such conventional acceleration sensors have a number of drawbacks which include susceptibility to poor sensitivity, fabrication processing complications, susceptibility to impulsive shocks due to handling, and problems caused by temperature-induced stresses.

Accordingly, conventional linear accelerometers often suffer from various drawbacks including deficiencies in sensitivity of the microsensor due to the structural asymmetries, fabrication processing, packaging, impulsive shocks due to handling, and temperature-induced stresses. It is therefore desirable to provide for a low cost, easy to make and use, and enhanced sensitivity linear accelerometer that eliminates or reduces the drawbacks of prior known linear accelerometers.

SUMMARY OF THE INVENTION

In accordance with the teachings of the present invention, a linear accelerometer is provided having a substrate, a fixed electrode supported on the substrate and including a first plurality of fixed capacitive plates, and an inertial mass substantially suspended over a cavity and including a plurality of movable capacitive plates arranged to provide a capacitive coupling with the first plurality of fixed capacitive plates. The inertial mass is linearly movable relative to the fixed electrode. A central member is fixed to the substrate and located substantially in a central region of the inertial mass. A plurality of support arms support the inertial mass relative to the fixed electrode and allow linear movement of the inertial mass upon experiencing a linear acceleration along a sensing axis, and prevent linear movement along a nonsensing axis. An input is electrically coupled to one of the fixed electrodes or the inertial mass for receiving an input signal, and an output is electrically coupled to the other of the fixed electrode or the inertial mass for providing an output signal which varies as a function of the capacitive coupling and is indicative of linear acceleration along the sensing axis.

By connecting the inertial mass to the fixed central member via the plurality of support arms, the linear accelerometer is less sensitive to stresses induced by fabrication processing, packaging, handling, and structural asymmetries. The realization of high mechanical sensing gain is also realized with the linear accelerometer to achieve enhanced immunity to electromagnetic interference (EMI) signals and environmental conditions, such as temperature. The linear accelerometer also provides high gain for linear accelerations about the sensing axis, while minimizing the effects of sensitivity due to linear off-axis accelerations and rotational cross-axis accelerations.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
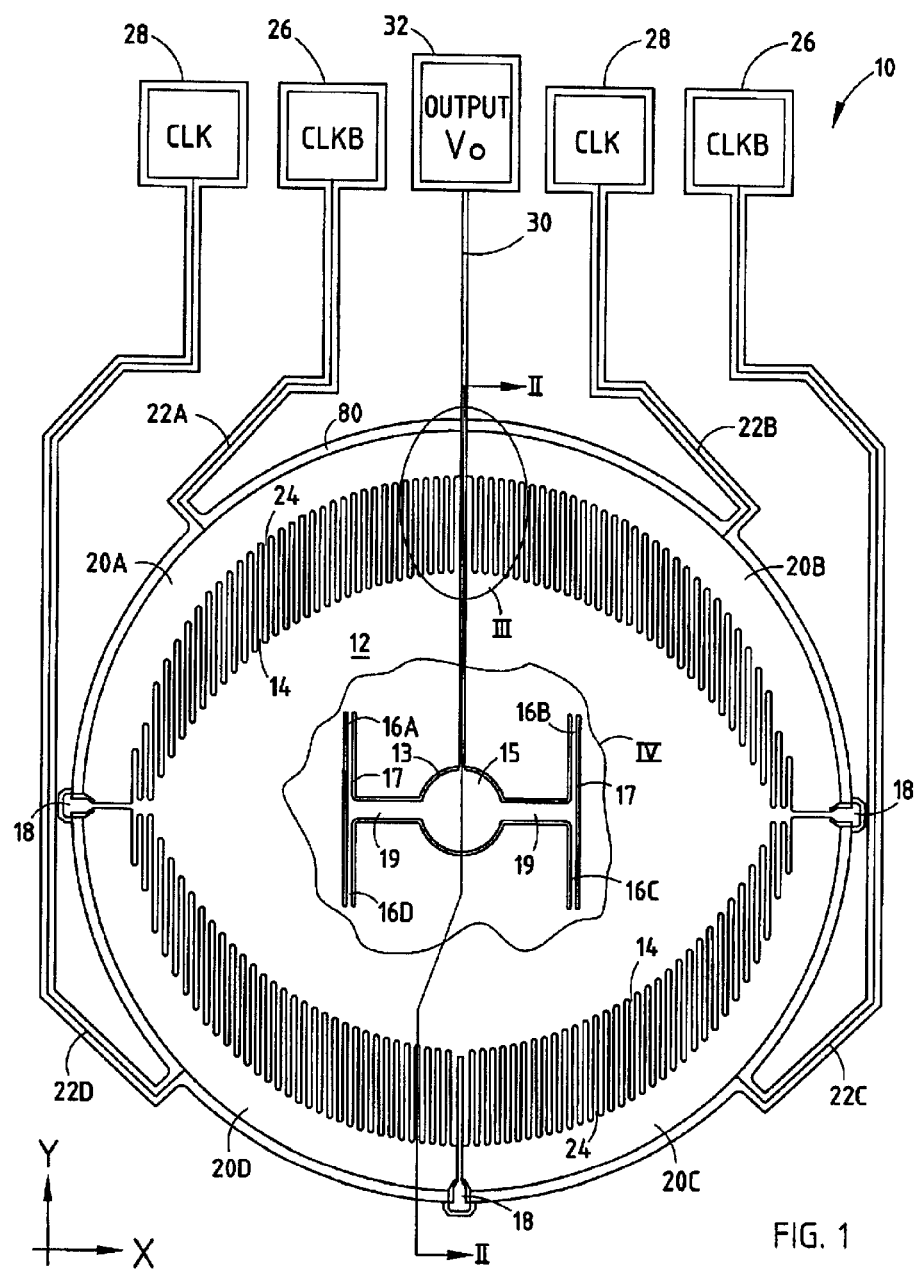
FIG. 1 is a top view of a linear accelerometer formed on a substrate according to a first embodiment of the present invention.
Figure 2:
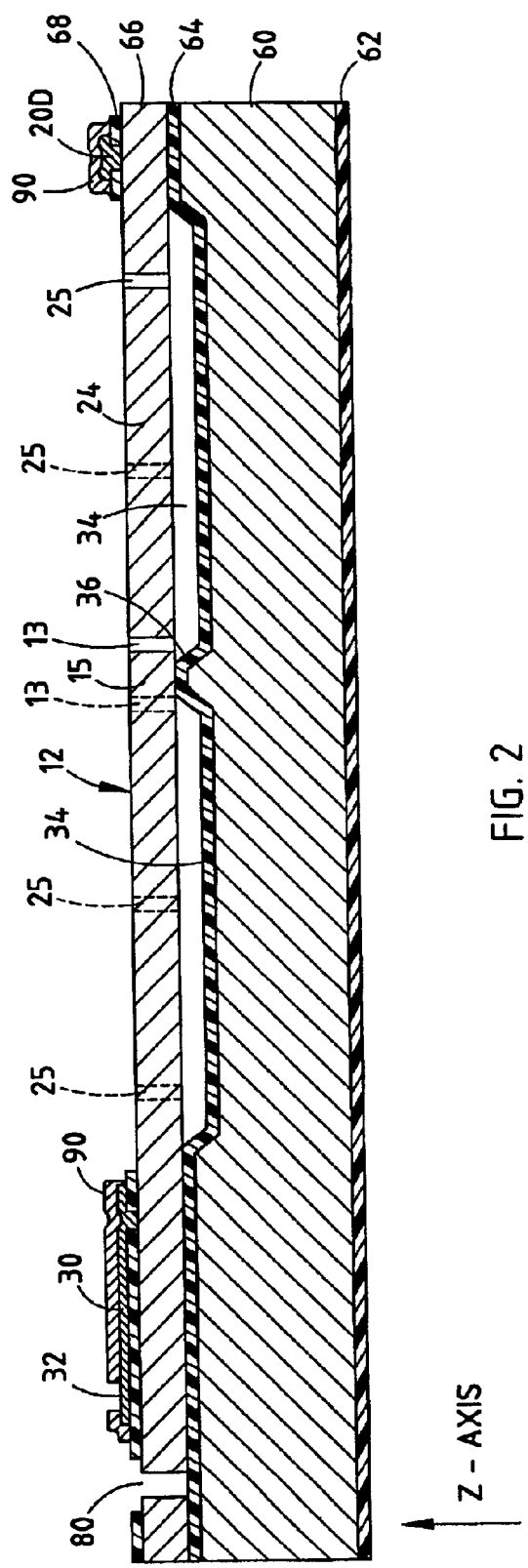
FIG. 2 is a cross-sectional view of the linear accelerometer taken through lines II—II of FIG. 1.

Referring to FIGS. 1 and 2, a linear accelerometer 10 is illustrated according to the first embodiment of the present invention for sensing linear acceleration along a designated sensing axis, shown configured in this embodiment as the X-axis. The linear accelerometer 10 senses linear acceleration along the sensing X-axis, while preventing the sensing of linear off-axis accelerations along other axes, such as the Y-axis and Z-axis, and rotational cross-axis accelerations. The linear accelerometer 10 is a micromachined accelerometer having an inertial mass and supporting structure which greatly minimizes the sensitivity of the microsensor to structural asymmetries, fabrication processing, packaging, impulsive shocks due to handling, and temperature-induced stresses. Additionally, the linear accelerometer 10 has high sensitivity due to high mechanical gain, and thus is less sensitive to noise interference such as electromagnetic interference (EMI).

The linear accelerometer 10 is fabricated on a single-crystal silicon substrate 60 using a trench etching process, such as DRIE and bond-etchback process. The etching process may include etching out a pattern from a doped material suspended over a cavity 34 to form a conductive pattern that is partially suspended over the cavity 34. One example of an etching process that may be used to form the linear accelerometer 10 of the present invention is disclosed in commonly assigned application Ser. No. 09/410,713, filed on Oct. 1, 1999, and entitled "MEMS STRUCTURE AND MICROFABRICATION PROCESS," which is incorporated herein by reference. While the linear accelerometer 10, as described herein, is fabricated on a single-crystal silicon substrate using a trench etching process, it should be appreciated that the linear accelerometer 10 could be fabricated using other known fabrication techniques, such as: an etch and undercut process; a deposition, pattern, and etch process; and an etch and release process, without departing from the teachings of the present invention.

The linear accelerometer 10 includes an inertial mass 12, generally formed in the shape of an annular ring, suspended over cavity 34, and a stationary central member 15 trench etched from the mass 12 and fixedly attached to the underlying substrate 60 via oxide layer 64 and centered in the annular ring-shaped mass 12. The inertial mass 12 has a plurality of rigid comb-like conductive fingers 14 extending outward from the outer peripheral edge of the annular ring to serve as movable capacitive plates. The conductive fingers 14 are formed along an axis (e.g., Y-axis) perpendicular to the sensing axis (e.g., X-axis). The inertial mass 12 with comb-like conductive fingers 14, is a movable mass that is suspended over a cavity by support arms which are formed to allow inertial mass 12 to move linearly about the sensing X-axis when subjected to a linear acceleration along the sensing X-axis of the linear accelerometer 10. For purposes of discussion herein, the X-axis and Y-axis are defined as shown oriented in FIG. 1, and the Z-axis is defined as shown in FIG. 2.

According to the first embodiment shown, the linear accelerometer 10 has a main central portion having a substantially elliptical shaped ring, with the conductive fingers 14 extending outward from the central portion and perpendicular to the sensing X-axis. Accordingly, the plurality of conductive fingers 14 are arranged extending along the Y-axis. The length of the conductive fingers 14 may vary as shown such that longer conductive fingers 14 are formed at the narrower part of the central portion of mass 12, as compared to the wider part of the central portion of mass 12, to achieve a substantially round-shape for the overall configuration of the inertial mass 12 and conductive fingers 14.

The inertial mass 12 is shown generally suspended above cavity 34 via a support assembly including four support arms (i.e., tethers) 16A–16D. According to the embodiments shown and described herein, four support arms 16A–16D are spaced apart from one another so as to support four corresponding quadrants of the inertial mass 12. While four support arms 16A–16D are shown and described herein in connection with the first embodiment, it should be appreciated that any number of a plurality of support arms may be employed in accordance with the teachings of the present invention. While a different number of support arms may be employed, it is preferred that the linear accelerometer 10 contain an even number of support arms.

A central member 15 is fixed to the underlying substrate and is located substantially in the center region of the inertial mass 12. The central member 15 is connected to rigid members 19 extending on opposite sides along the X-axis, with each of the support arms 16A–16D extending along the Y-axis from the outer end of one of the rigid members 19. Thus, support arms 16A–16D are formed as extensions from the rigid members 19 which, in turn, are formed as extensions from the central member 15. The center member 15 and rigid members 19 are substantially fixed with respect to the substrate and are generally inflexible to acceleration. The support arms 16A–16D are flexible beams that act as springs which are compliant to bending along the sensing X-axis, but are relatively stiff to bending in the direction of the Z-axis which extends perpendicular to a plane formed by the X-axis and Y-axis. Additionally, the extension of the support arms 16A–16D along the Y-axis further prevents movement along the Y-axis. The support arms 16A–16D may have a thickness (depth) in the range of three to two hundred micrometers and a width in the range of one to twenty micrometers. According to one example, support arms 16A–16D may have a thickness of approximately thirty micrometers as compared to a width of approximately ten micrometers to provide a sufficient aspect ratio of thickness-to-width to allow for flexibility along the X-axis and stiffness in the Z-axis.

A pair of parallel slots (trenches) 17 are etched in the inertial mass 12 to form each of the support arms 16A–16D. The slots 17 extend through the entire depth of the inertial mass 12 and, in effect, results in slots 17 formed on opposite sides of each support arm. The slots 17 form air gaps which allow the support arms 16A–16D to be connected at a location radially outward from the inner edge, thereby providing for an increased effective overall length and greater flexibility of the support arms 16A–16D. The four support arms 16A–16D thereby substantially suspend the inertial mass 12 above cavity 34, and allow linear movement of the inertial mass 12 along the X-axis when subjected to linear acceleration along the X-axis. By employing four support arms 16A–16D, the entire structure is stiff with respect to linear accelerations along the Y-axis, yet the inertial mass 12 is free to move along the X-axis within the constraints of the support arms 16A–16D.

Fixed to a thick oxide insulation layer 64 on top of substrate 60 are four fixed electrodes 20A–20D, each having a plurality of fixed capacitive plates 24 interdisposed between adjacent movable capacitive plates 14, to form four banks of variable capacitors. The first fixed electrode 20A has a clock input line 22A for receiving a signal CLKB 26, such as a square wave signal. The plurality of fixed capacitive plates 24 provided with the first fixed electrode 20A are interdisposed between adjacent movable capacitive plates 14 of inertial mass 12 for approximately one-quarter rotation (i.e., a ninety degree window) of inertial mass 12, to provide a first bank of capacitors. The second fixed electrode 20B likewise has a plurality of fixed comb-like capacitive plates 24 interdisposed between adjacent movable capacitive plates 14 of inertial mass 12 for approximately one-quarter of its rotation to provide a second bank of capacitors. The second fixed electrode 20B has a clock input 22B for receiving a signal CLK 28, such as a square wave signal. The third fixed electrode 20C also includes a plurality of fixed comb-like capacitive plates 24 for approximately one-quarter of movable capacitive plates 14 of inertial mass 12, to provide a third bank of capacitors, and likewise receives signal CLKB 26 via input line 22C. The fourth fixed electrode 20D has a plurality of fixed capacitive plates 24 for approximately the remaining one-quarter of the movable capacitive plates 14 of inertial mass 12, to provide a fourth bank of capacitors, and receives signal CLK 28 via input line 22D. It should be appreciated that the number of fixed electrodes can be increased to multiples of four, as represented by equation 4×N, where N=1, 2, 3, 4, etc., which may advantageously provide for good matching and cross-axis rejections.

Each of the fixed electrodes 20A–20D are formed near the outer perimeter of the inertial mass 12 extending through an angular rotation of approximately 90 degrees (90°). Adjacent fixed electrodes 20A–20D are dielectrically isolated from one another via isolators 18. Each isolator 18 has one or more slots that serve to provide a dielectric air gap. The fixed electrodes 20A–20D and corresponding plurality of fixed capacitive plates 24 are fixed in place supported on top of insulation layer 64 and substrate 60. Accordingly, the inertial mass 12 and its rigid outer peripheral capacitive plates 14 are able to move relative to fixed capacitive plates 24 in response to a linear acceleration experienced along the sensing X-axis.

The inertial mass 12 and movable capacitive plates 14 are electrically conductive and are electrically connected via an output line 30 to output pad 32 for providing an output charge $V_O$. The output charge $V_O$ is processed to generate a voltage which has a voltage level indicative of the linear displacement of the inertial mass 12 relative to the fixed electrodes 20A–20D due to linear acceleration about the sensing X-axis. Accordingly, by measuring the output charge $V_O$ at output pad 32, the linear accelerometer 10 provides an indication of the linear acceleration experienced along the sensing X-axis.

With particular reference to the cross section shown in FIG. 2, the linear accelerometer 10 includes substrate 60 which serves as the underlying support. Substrate 60 may include a silicon or silicon-based substrate having the thick oxide insulation layer 64 formed on the top surface, and a bottom oxide insulation layer 62 formed on the bottom surface. The substrate 60 may include silicon, or alternate materials such as glass or stainless steel. The substrate 60 and thick oxide insulation layer 64 are configured to provide a cavity 34 below the inertial mass 12. Additionally, substrate 60 and oxide layer 64 form a central pedestal 36 below the fixed central member 15 for purposes of fixing the central member 15 in place relative to the substrate 60. Central pedestal 36 also provides structural support during the fabrication process.

Formed above the substrate 60 and on top of insulation layer 64 is an EPI layer 66 made of conductive material, such as silicon. EPI layer 66 is made of a conductive material and is etched to form various components including the inertial mass 12, central member 15, isolation trenches 80, air gaps 13 and 25, and other elements that support or isolate conductive signal paths. Trenches 80 and air gaps 13 and 25 provide physical and electrical isolation between adjacent elements. The EPI layer 66 may have a thickness in the range of 3 to 200 micrometers, and more particularly of approximately 30 micrometers, according to one embodiment. With the main exception of the inertial mass 12 and central member 15, the EPI layer 66 further includes a field passivation layer 68 disposed on the top surface thereof. The conductive signal paths of electrodes 20A–20D, lines 22A–22D, and data line 30 are formed on top of the conductive EPI layer 66 and partially on top of dielectric field passivation layer 68 to provide signal transmission paths. In addition, a metal passivation layer 90 is formed over each of these signal paths.

Prior to the etching process, the central pedestal 36 provides structural support for the EPI layer 66 to allow the central mass 15 to be fixedly provided on top thereof. By providing a central pedestal 36, the structural integrity of the linear accelerometer 10 is enhanced during the fabrication process. After the etching process, the central pedestal 36 supports the central member 15 which, in turn, supports the inertial mass 12 via rigid members 19 and support arms 16A–16D. By supporting the EPI layer 66 in the central region during the manufacturing process, the maximum stress experienced is greatly reduced.

Figure 3:
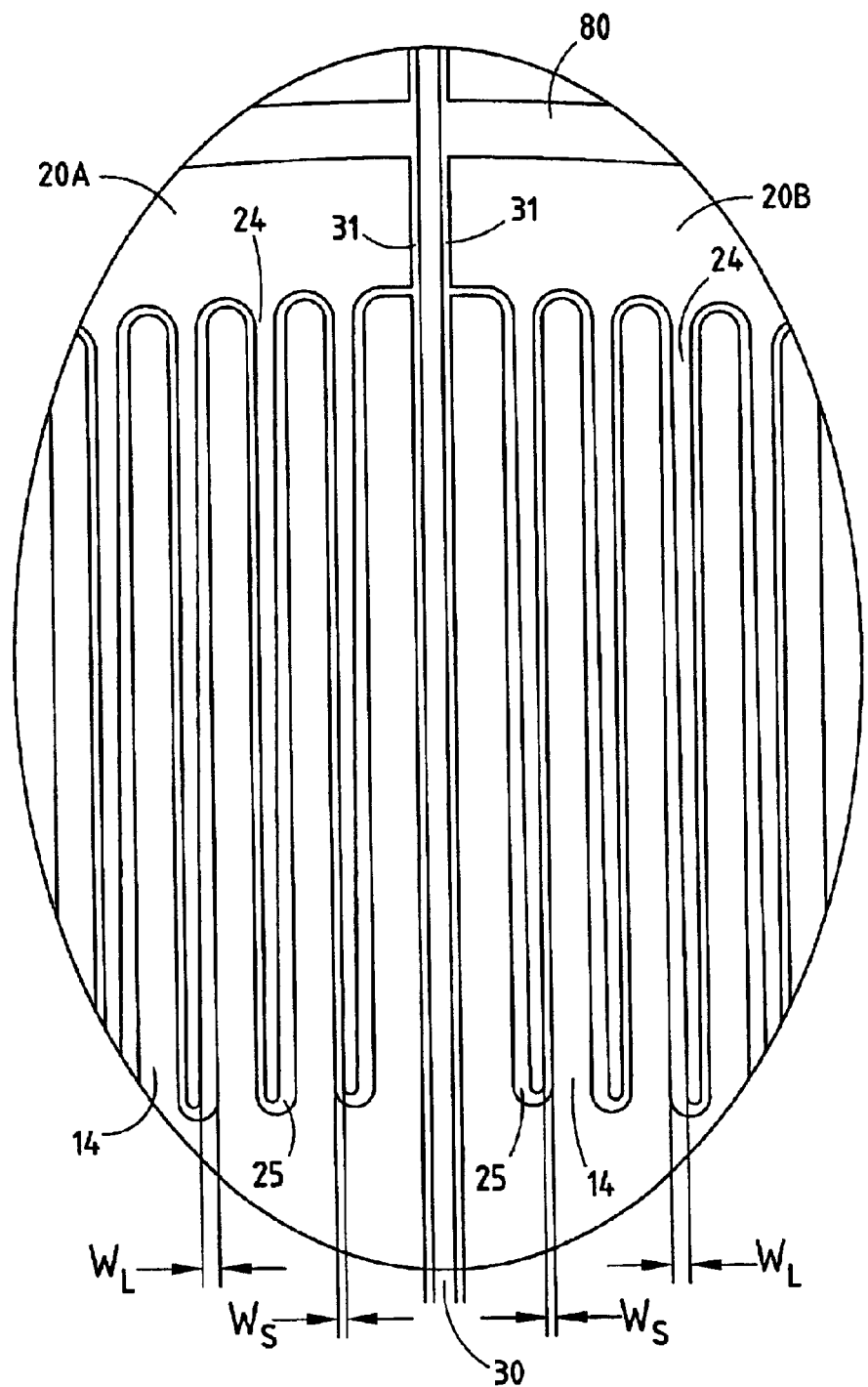
FIG. 3 is an enlarged view of section III of FIG. 1.

Referring to FIG. 3, a portion of the linear accelerometer 10 is further illustrated in greater detail. Data line 30 extends within a pair of parallel radial slots 31 extending along the Y-axis formed through the entire depth of inertial mass 12 to provide an electrical path between the central member 15 and the output pad 32. The slots 31 provide dielectric isolation between the data line 30 and inertial mass 12, as well as between adjacent fixed electrodes 20A and 20B, while allowing the inertial mass 12 and capacitive plates 14 to move along the X-axis, within limits. Trenches 80 isolate the fixed electrodes from the outer surrounding elements. The fixed capacitive plates 24 are interdisposed between adjacent movable capacitive plates 14 and separated one from another via air gap 25. The air gap 25 between capacitive plates 14 and 24 allows for movable capacitive plates 14 to move relative to the fixed capacitive plates 24. Each of the movable capacitive plates 14 has a very small mass as compared to the inertial mass 12, and are rigid to prevent movement relative to the inertial mass 12. Additionally, the movable and fixed capacitive plates 14 and 24, respectively, each has a thickness equal to the thickness of the EPI layer 66. Because total change of capacitance is proportional to thickness of the capacitive plates 14 and 24, the signal-to-noise ratio is enhanced with enlarged thickness.

The air gap 25 between capacitive plates 14 and 24 is greater on one side of plate 14 as compared to the opposite side. For example, with respect to the bank of capacitors formed by fixed electrode 20B, the width $W_L$ of air gap 25 between capacitive plates 14 and 24 is approximately twice the width $W_S$. The air gap 25 between adjacent pairs of capacitive plates 14 and 24 is configured substantially the same for each of the fixed capacitive plates connected to the fixed electrode. However, for adjacent fixed electrodes 20A and 20B, the orientation of the conductive plates 14 and 24 is switched in that the larger air gap with $W_L$ and smaller gap width $W_S$ of air gap 25 is on the opposite side as compared to the adjacent fixed electrode. For example, the fixed capacitive plates 24 on fixed electrode 20A are separated from movable capacitive plates 14 by an air gap 25 of width $W_L$ twice as wide on the left side of capacitive plates 14 as the width $W_S$ on the right side of capacitive plates 14, while fixed electrode 20B is configured with a larger air gap width $W_L$ on the right side of plate 14 as compared to its left side. Additionally, motion stop beads (not shown) can be formed on either or both of the movable and fixed capacitive plates 14 and 24, respectively, for limiting the relative movement between capacitive plates 14 and 24, in the event excessive linear acceleration is experienced along the X-axis.

The linear accelerometer 10 shown and described herein has four banks of variable capacitors formed by capacitive plates 14 and 24. The capacitive plates 14 and 24 associated with the first fixed electrode 20A are a mirror image of the capacitive plates 14 and 24 associated with the fixed electrode 20B. Likewise, the arrangement of the capacitive plates 14 and 24 associated with fixed electrode 20C is a mirror image of the capacitive plates 14 and 24 associated with fixed electrode 20D. The capacitive plates 24 associated with fixed electrodes 20A and 20C have a certain positive-to-negative orientation with respect to capacitive plates 14. In contrast, the positive-to-negative orientation between capacitive plates 14 and 24 for the fixed electrodes 20B and 20D are arranged oppositely. By alternating the orientation of the plurality of four banks of capacitors in four quadrants as disclosed, the linear accelerometer 10 of the present invention essentially nulls out rotational cross-axis sensitivities and linear off-axis sensitivities, and allows for linear acceleration to be sensed about the sensing X-axis. Further, by employing a plurality of fixed capacitive plates 24 commonly connected to fixed electrodes 20A–20D a reduced number of signal input and output lines may be achieved.

Figure 4:
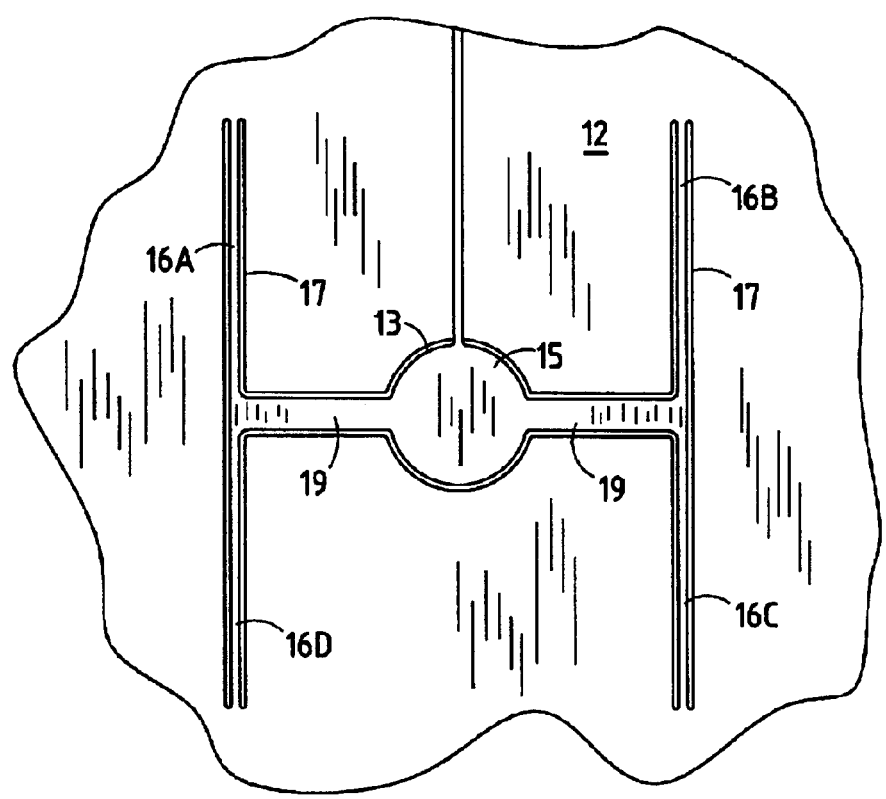
FIG. 4 is an enlarged view of central section IV of FIG. 1.

Referring to FIG. 4, an enlarged central portion of the angular accelerometer 10 is illustrated therein in greater detail. The central member 15 is shown separated from inertial mass 12 via air gap 13. Rigid members 19 extend on opposite sides and likewise are separated from the inertial mass 12 via air gap 13. At the outer ends of each of rigid members 19 are the vertically (Y-axis) disposed support arms 16A–16D, each of which extends perpendicular to the sensing X-axis. Each of support arms 16A–16D is formed by cutting out air gaps 13 from inertial mass 12. Each of support arms 16A–16D is formed of a continuous conductive signal line which, in addition to physically supporting the inertial mass 12, also transmits electrical signals. Support arms 16A–16D are formed by etching to remove material to form the bordering slots 17. Support arms 16A–16D flex within slots 17 to allow linear movement of the inertial mass 12 along the sensing X-axis relative to the central member 15 and rigid members 19. Accordingly, support arms 16A–16D provide rigid support along the Y-axis and the Z-axis, while allowing for linear motion due to acceleration about the X-axis.

Figure 5:
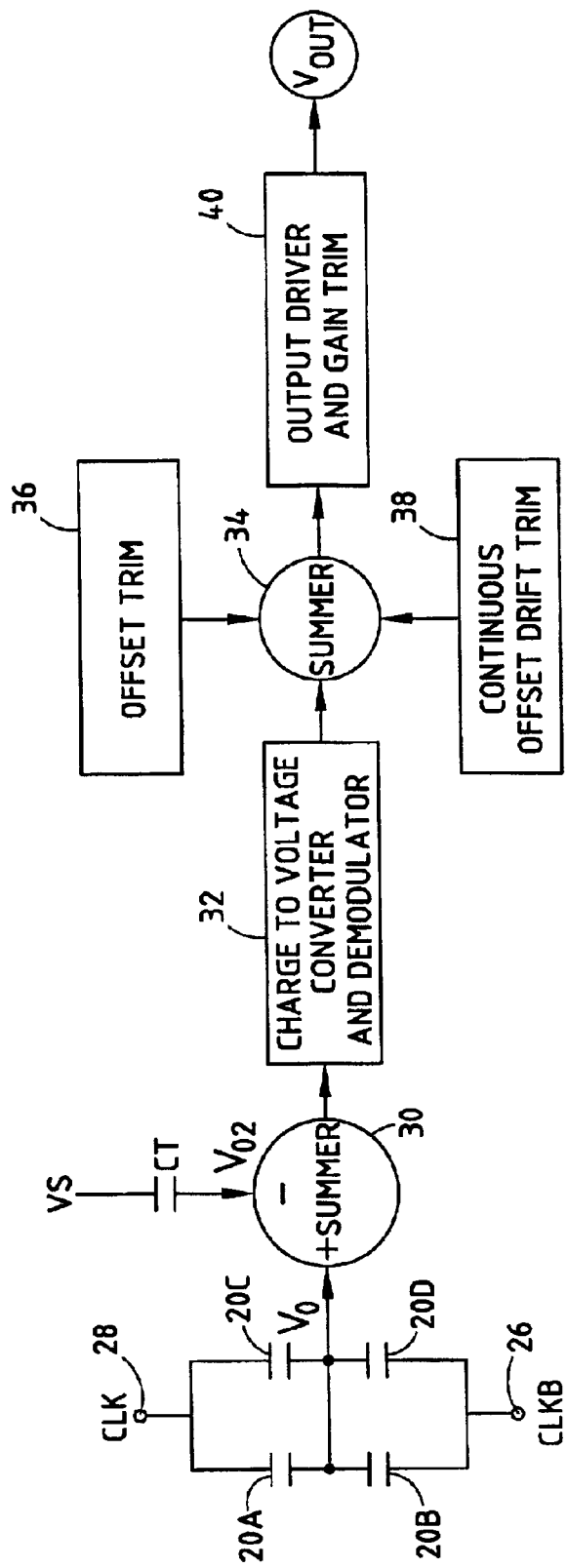
FIG. 5 is a block/circuit diagram illustrating processing circuitry coupled to the linear accelerometer.

Referring to FIG. 5, processing of the signals applied to and sensed with the linear accelerometer 10 is illustrated according to one embodiment. The fixed electrodes 20A–20D are generally shown receiving clock signal CLKB at pad 26 and signal CLK at pad 28. Clock signals CLKB and CLK may be rectangular, e.g., square, wave-generated signals that have alternating voltage levels of $V_S$ and zero volts or $+V_S$ and $-V_S$. Clock signal CLKB is one hundred eighty degrees (180°) out of phase, i.e., inverse, as compared to clock signal CLK and therefore provides an opposite phase rectangular waveform. The processing circuitry includes a summer 30 for receiving the output voltage $V_0$ on pad 32 and a voltage $V_{02}$ received from the summation of the capacitors, represented herein as CT, when a voltage source $V_S$ is applied thereto. Voltage $V_{02}$ contains noise present in the sensed signal, and summer 30 subtracts the noise from the output charge $V_0$. The output of summer 30 is applied to a charge-to-voltage converter and demodulator 32 which converts the processed charge to a voltage signal. The voltage signal is then input to a summer 34 which receives a signal from an offset trim 36 and a signal from a continuous offset drift trim 38. The offset trim 36 provides a signal which compensates for bias. The continuous offset drift trim 38 provides a signal which compensates for bias drift, particularly due to temperature variations. Accordingly, summer 34 sums the trimmed signals with the voltage output so as to compensate for bias errors. The bias compensated voltage is then applied to an output driver and gain trim 40 which rescales the voltage to within a desired range and produces the output signal $V_{OUT}$. It should be appreciated that the output signal $V_{OUT}$ may be further processed via further control circuitry, such as a microprocessor-based controller, to perform various control functions.

Figure 6:
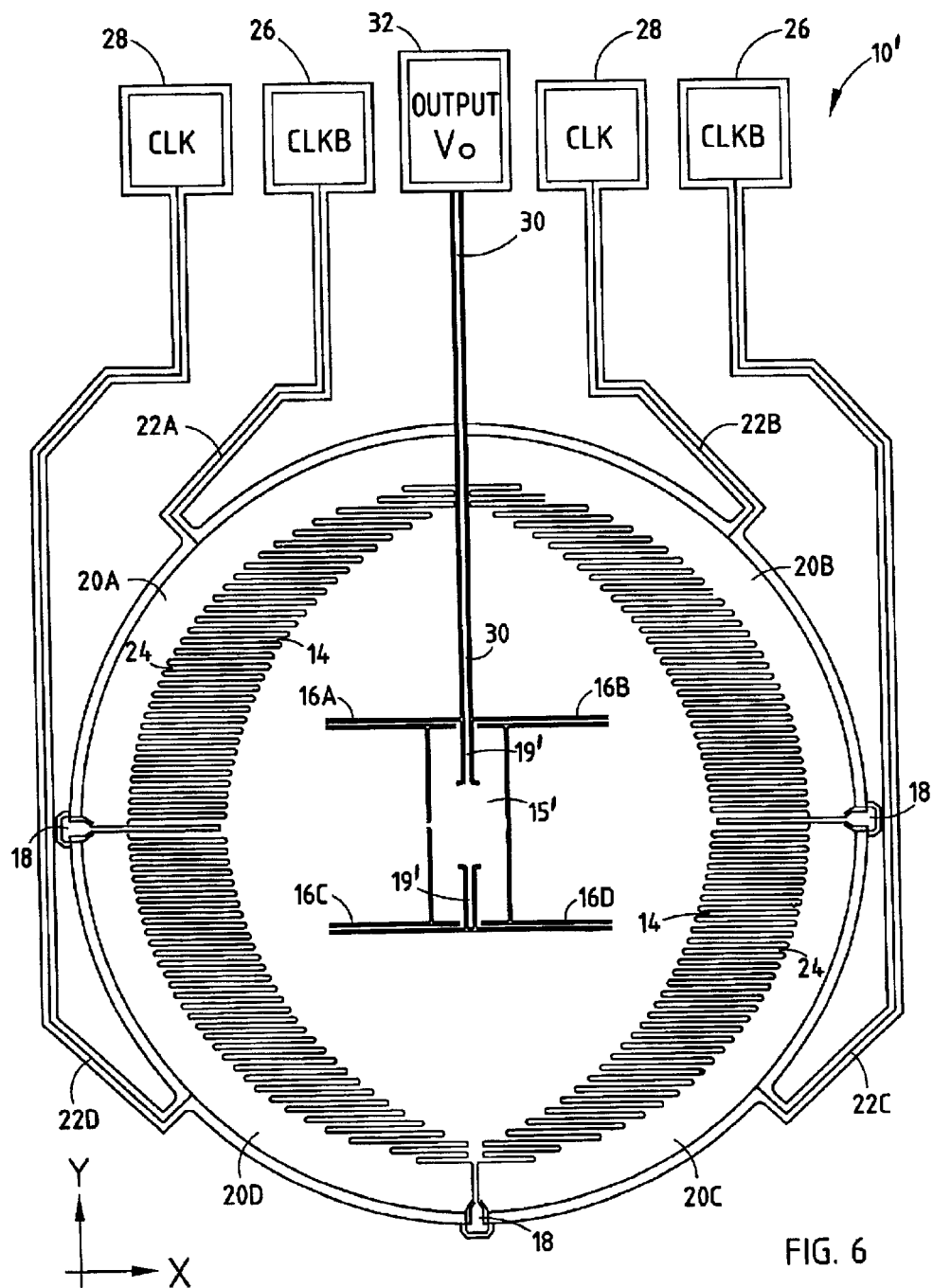
FIG. 6 is a top view of a linear accelerometer formed on a substrate according to a second embodiment of the present invention.

Referring to FIG. 6, a linear accelerometer 10' is shown according to a second embodiment of the present invention. The second embodiment of the linear accelerometer 10' differs from the first embodiment of linear accelerometer 10, in that the capacitive plates 14 and 24 are rotated ninety degrees (90°) so as to sense linear acceleration about the Y-axis, instead of the X-axis. In addition, linear accelerometer 10' employs a substantially rectangular central member 15' connected to the underlying substrate, and employs connecting arms 19' which connect the central member 15' to each of the four support arms 16A–16D. The support arms 16A–16D extend along the X-axis so as to sense linear accelerations directed along the Y-axis. The interconnecting members 19' extend vertically inward into central member 15' so as to provide flexibility at the connection of the support arms 16A–16D.

In operation, the linear accelerometer of the present invention provides a measurement of the linear acceleration along a designated axis, such as the X-axis in FIG. 1 or the Y-axis in FIG. 6. While two embodiments are shown for sensing linear acceleration about the X-axis and Y-axis, it should be appreciated that the accelerometer may otherwise be configured to provide linear acceleration measurements along any other designated axis.

In measuring linear acceleration, the inertial mass 12, when subjected to a linear acceleration about the sensing axis, moves relative to the fixed electrodes 20A–20D and within the restraining limits of the support arms 16A–16D. If the inertial mass 12 moves linearly and in a positive direction along the sensing axis, the opposing banks of variable capacitors formed by fixed electrodes 20A and 20C increase in capacitance, while the opposing banks of variable capacitors formed by electrodes 20B and 20D decrease in value, or vice versa. The change in capacitance provides a voltage output signal $V_0$ that is indicative of the linear acceleration experienced. Since the support arms 16A–16D are integrally formed within slots 17 in the inertial mass 12 and attached to the central member 15, susceptibility to damage by external shock is thus reduced. In addition, the supporting arrangement minimizes sensitivity of the microsensor to structural asymmetries. Further, sensitivities due to fabrication processing, packaging, shocks subjected during handling, and temperature-induced stresses are greatly minimized with the configuration of the present invention. Further, the high mechanical gain achieved with the linear accelerometer along the main linear axis results in an accelerometer that is substantially immune to EMI signals and other noise signals. By connecting the inertial mass ring to the fixed central member via the plurality of support members, the linear accelerometer is less sensitivity to stresses induced by fabrication processing, packaging, handling, and structural asymmetries. The realization of high gain enhances immunity to EMI signals and environmental conditions such as temperature and humidity. In addition, the linear accelerometer provides high gain for linear accelerations about the sensing axis, while minimizing linear and cross-axis sensitivities.

The method of forming the linear accelerometers 10 and 10' in a single-crystal silicon epitaxy layer (EPI) suspended over a cavity may include the following steps. First, a cavity is etched into a handle wafer, then a second wafer is bonded to the handle and etched back to the requisite device thickness. This direct silicon bonding is a mature process. Appropriate films are grown or deposited over the EPI, contacts are etched, and metal is routed. Then the active structure is masked and etched. Finally, the sensor die is capped to prevent particulate contamination and moisture intrusion. It should be appreciated that other known techniques may be employed to manufacture the linear accelerometer according to the present invention.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

What is claimed is:

1. A micromachined linear accelerometer comprising:
   a substrate;
   a fixed electrode supported on the substrate and including a first plurality of fixed capacitive plates;
   a ring having a central opening and including a plurality of movable capacitive plates at the outer perimeter arranged to provide a capacitive coupling with the first plurality of fixed capacitive plates, said ring being suspended over a cavity and linearly movable relative to the fixed electrode;
   a central member fixed to the substrate and located within the central opening of the ring;
   a plurality of support arms extending between the central member and the ring for supporting said ring relative to said fixed electrode and allowing linear movement of the ring along a sensing axis upon experiencing a linear acceleration along the sensing axis;
   an input electrically coupled to one of either the fixed electrodes and the ring for receiving an input signal; and
   an output electrically coupled to the other of the fixed electrode and the ring for providing an output signal which varies as a function of the capacitive coupling and is indicative of linear acceleration along the sensing axis.

2. The linear accelerometer as defined in claim 1, wherein each of the plurality of support arms comprises an arm extending between the ring and a rigid member coupled to the central member, and wherein the arm is formed by removing material on opposite sides of the arm.

3. The linear accelerometer as defined in claim 1, wherein each of said plurality of arms extends substantially perpendicular to the sensing axis.

4. A linear accelerometer comprising:
   a substrate;
   a fixed electrode supported on the substrate and including a first plurality of fixed capacitive plates;
   an inertial mass substantially suspended over a cavity and including a central portion and a plurality of movable capacitive plates arranged to provide a capacitive coupling with said first plurality of fixed capacitive plates, said inertial mass being linearly movable relative to said fixed electrode, wherein the first plurality of movable capacitive plates extend from an outer perimeter of the central portion of the inertial mass, and the first plurality of fixed capacitive plates are displaced from the central portion of the inertial mass;
   a central member fixed to said substrate and located substantially in a central region of the central portion of said inertial mass;
   a plurality of support arms for supporting the inertial mass relative to the fixed electrode and allowing linear movement of the inertial mass upon experiencing a linear acceleration along a sensing axis, and for preventing movement along a nonsensing axis;
   an input electrically coupled to one of either the fixed electrode and the inertial mass for receiving an input signal; and
   an output electrically coupled to the other of the fixed electrode and the inertial mass for providing an output signal which varies as a function of the capacitive coupling and is indicative of linear acceleration along the sensing axis.

5. The linear accelerometer as defined in claim 4, wherein the central portion of the inertial mass has a substantially annular ring shape.

6. The linear accelerometer as defined in claim 5, wherein the central portion of the inertial mass has an elliptical shaped ring.

7. The linear accelerometer as defined in claim 4, wherein the plurality of support arms extend perpendicular to the sensing axis.

8. The linear accelerometer as defined in claim 7, wherein said plurality of support arms extend between the inertial mass and a rigid member fixedly coupled to the central member.

9. The linear accelerometer as defined in claim 4, wherein said plurality of support arms comprises at least four tethers.

10. The linear accelerometer as defined in claim 4, wherein each of said plurality of support arms are flexible so as to bend during linear acceleration about the sensing axis, yet rigid to resist bending due to linear accelerations about the non-sensing axis.

11. The linear accelerometer as defined in claim 4, wherein said substrate comprises a silicon substrate.

12. The linear accelerometer as defined in claim 4, wherein said linear accelerometer is fabricated by a trench etching process.

13. A linear accelerometer comprising:
    a substrate;
    a first bank of variable capacitors formed on a first plurality of fixed capacitive plates and a first plurality of movable capacitive plates;
    a second bank of variable capacitors formed on a second plurality of fixed capacitive plates and a second plurality of movable capacitive plates;
    an inertial mass that is linearly movable in response to linear acceleration along a sensing axis, wherein the inertial mass is electrically coupled to said first and second plurality of movable capacitive plates and is arranged so that said first and second movable capacitive plates form capacitive couplings with said first and second plurality of fixed capacitive plates, wherein the first movable capacitive plates form a capacitive coupling having a positive-to-negative orientation with respect to the sensing axis, and the second movable capacitive plates and second plurality of fixed capacitive plates form a capacitive coupling having an opposite positive-to-negative orientation with respect to the sensing axis;
    a central member fixed to said substrate and centrally located within said inertial mass and separated therefrom;
    a plurality of support arms extending between the central mass and the inertial mass for supporting the inertial mass and movable capacitive plates relative to the first and second capacitive plates and allowing linear movement of the inertial mass upon experiencing a linear acceleration along the sensing axis and for preventing linear movement along a nonsensing axis;

a first input electrically coupled to the first plurality of fixed capacitive plates;

a second input electrically coupled to the second plurality of fixed capacitive plates; and an output electrically coupled to the plurality of movable capacitive plates for sensing an output signal indicative of linear acceleration sensed along the sensing axis in response to linear movement of the inertial mass.

14. The linear accelerometer as defined in claim 13, wherein each of the plurality of support arms comprises a tether having a section extending substantially perpendicular to the sensing axis.

15. The linear accelerometer as defined in claim 14, wherein said tether is connected between the inertial mass and a rigid member coupled to the central member.

16. The linear accelerometer as defined in claim 13 wherein said first and second plurality of movable capacitive plates extend from an outer perimeter of a central portion of the inertial mass, and the first and second fixed capacitive plates are displaced from the central portion of the inertial mass.

17. The linear accelerometer as defined in claim 13, wherein said substrate comprises a silicon substrate.

18. The linear accelerometer as defined in claim 17, wherein said linear accelerometer is fabricated by a trench etching process.

19. The linear accelerometer as defined in claim 13 further comprising:

a third bank of variable capacitors formed of a third plurality of fixed capacitive plates and a third plurality of movable capacitive plates; and a fourth bank of variable capacitors formed of a fourth plurality of fixed capacitive plates and a fourth plurality of movable capacitive plates.

20. The linear accelerometer as defined in claim 19, wherein said plurality of support arms comprise at least four tethers.

21. The linear accelerometer as defined in claim 13, wherein each of said support arms are flexible so as to bend during linear acceleration about the sensing axis, yet rigid to resist bending due to acceleration along the nonsensing axis.

* * * * *